3,153,105
NOVEL PROCESS FOR THE MOLECULAR
ORIENTATION OF POLYMERS
Howard C. Haas, Arlington, Mass., assignor to Polaroid Corporation, Cambridge, Mass., a corporation of Delaware
No Drawing. Filed July 10, 1961, Ser. No. 122,616
7 Claims. (Cl. 264—2)

This invention relates to a novel process for preparing molecularly oriented materials.

One object of this invention is to provide an improved method for molecularly orienting polyhydroxy, strongly hydrogen-bonded polymers.

Another object is to provide a method of casting films and molecularly orienting polymers that are difficult to cast or cannot be cast into films by usual means.

Another object is to provide an improved method of preparing novel molecularly oriented polymeric materials for use in light polarizers.

Other objects of the invention will in part be obvious and will in part appear hereinafter.

The invention accordingly comprises the several steps and the relation and order of one or more of such steps with respect to each of the others, and the scope of the application of which will be indicated in the claims.

For a fuller understanding of the nature and objects of the invention, reference should be had to the following detailed disclosure.

The molecular orientation of most polymeric films is generally accomplished by heating or plasticizing a cast film, stretching linearly and then cooling or treating the film in such a manner that the plasticity of the film is arrested. However, in orienting certain types of polymers, plasticizing agents that are dangerous and/or difficult to use may be necessary. Polymers that are difficult to cast into films or cannot be cast at all into films present an additional problem if molecularly oriented materials are desired. This invention provides a method whereby such polymers can be readily cast into films and molecularly oriented.

In preparing an oriented material from polyhydroxy, strongly hydrogen-bonded polymers, for example cellulose, it has been necessary to swell the film, for example, with 20% alkali solution, stretch it linearly while the film is swelled by the alkali treatment, harden the stretched film by neutralization in a weak acid solution, and wash and dry the resulting molecularly oriented sheet. Since swelling agents such as hot 20% alkali solutions are involved, the process is both dangerous and unwieldly. When a polymeric film is swelled with hot alkali it is usually impossible to accomplish more than about a 25% increase in its length. In addition, many strongly hydrogen-bonded polymers do not plasticize to an extent sufficient to accomplish the desired molecular orientation or cannot be cast into films. There is also the possibility that the polymer might undergo oxidation as a result of the alkali swelling treatment in the presence of air. Therefore, a need has existed for an efficient, manageable method of accomplishing such molecular orientation in polyhydroxy, strongly hydrogen-bonded polymers.

This invention provides a new and convenient method of preparing molecularly oriented polymeric materials, and is especially useful in preparing molecularly oriented polymers from polyhydroxy, strongly hydrogen-bonded polymeric materials such as cellulose and polyhydroxymethylene.

This invention involves the molecular orientation of polyhydroxy, strongly hydrogen-bonded polymers by converting the hydroxyl groups of the polymer to trifluoroacetate groups, casting a film from an organic solvent, stretching the film to the desired extent in order to impart the desired degree of molecular alignment, and, while the polymeric material is in the stretched condition, treating said material by removal of the trifluoroacetate groups so that it reverts to the polyhydroxy form while retaining the induced molecular orientation. It may be desirable to plasticize the cast film with, for example, a high boiling organic plasticizer.

By converting the polymer to the trifluoroacetate derivative, it is possible to cast films from readily available organic solvents; this cannot be accomplished with the unconverted polymer.

In a preferred embodiment, a polyhydroxy, strongly hydrogen-bonded polymeric material, for example cellulose, is converted to the trifluoroacetate derivative by, for example, treatment with trifluoroacetic acid and trifluoroacetic anhydride, the trifluoroacetate derivative is cast into a film, stretched to several hundred percent of its original length, and converted to its original polyhydroxyl form under conditions which do not allow relaxation, by removal of the trifluoroacetate groups, as by ammonolysis, to produce a polymer with its molecules in substantial alignment.

Other polymers that are difficult to cast into films, such as polyhydroxymethylene, may be readily cast into films after conversion to the trifluoroacetate derivative.

This invention is particularly useful in preparing, with relative ease and great control and flexibility in the process, molecularly oriented materials from polymers that are difficult to orient by known methods and polymers that cannot be cast into films. The flexibility in this process is accomplished by the utilization of readily available organic solvents and platsicizers to cast the film and control the degree of plasticity imparted to the film, even to the extent of increasing the plasticity while the stretching is being carried out should it be found necessary to further plasticize the film to accomplish the desired degree of stretch.

By the term "organic plasticizer" is contemplated a material that will plasticize or soften the trifluoroacetylated polymer to allow stretching, rather than flowing, of the polymer to provide the molecular orientation.

Polymers suitable to be used in this invention comprise polymers with polyhydroxyl groups that can be trifluoroacetylated. Mention may be made of polymers such as cellulose and polyhydroxymethylene.

This invention is useful in preparing molecularly oriented sheets or films that may be stained with dichroic stains or dyes to produce polarizers. This invention is also useful in producing molecularly oriented polymeric fibers.

A polarizer may be produced by this invention by converting cellulose into cellulose trifluoroacetate, casting a film, plasticizing the film, and stretching it to orient the molecules to substantial alignment, treating the film in such a manner that it reverts to cellulose, and incorporating therein a dichroic material, for example a dichroic dye or stain, to form therewith a light-polarizing complex of oriented cellulose and a dichroic material.

The following non-limiting examples illustrate the novel process within the scope of this invention.

*Example I*

Cellulose trifluoroacetate was prepared by reacting cellulose (sold commercially by Brown Co., Berlin, New Hampshire, under the trade name Solka Floc BW 200) under a nitrogen atmosphere with a mixture of trifluoroacetic acid and trifluoroacetic anhydride at 60° C. for 1.5 hours. The resulting fluoropolymer was purified by precipitation from acetone into hexane. A film was prepared from the cellulose trifluoroacetate by solvent casting from ethyl acetate containing a small amount of acetone. A small amount of high boiling dimethyl formamide was also present in the solution to plasticize the film. The film was then stretched several hundred percent over a hot plate. The resulting oriented film was then converted to cellulose by the application of gaseous ammonia. After conversion to cellulose, the film was extracted with ethanol to remove the product of ammonolysis, trifluoroacetamide and any dimethyl formamide remaining in the film.

*Example II*

A polarizer was prepared from the molecularly oriented cellulose film prepared in Example I, by staining the film with an aqueous solution of Congo Red dye, C.I. 22120 (Direct Red 28). The film was then measured in a Cary spectrodensitometer equipped with a Glan-Foucault prism polarizer and the dichroic ratio determined to be 8 at $\lambda_{max}$. The spectral range which was used included the main absorption band for Congo Red, 400 to 600 m$\mu$.

Since certain changes may be made in the above process without departing from the scope of the invention herein involved, it is intended that all matter contained in the above description shall be interpreted as illustrative and not in a limiting sense.

What is claimed is:

1. The process of molecularly orienting a polymer selected from the group consisting of cellulose and polyhydroxymethylene, comprising the steps of preparing the trifluoroacetate derivative of said polymer, casting a film thereof, extending said film linearly, and deacetylating said film under conditions which do not allow relaxation.

2. A process as defined in claim 1 wherein said trifluoroacetate derivative is prepared by treating said polymer with trifluoroacetic acid and trifluoroacetic anhydride.

3. A process as defined in claim 1 wherein said deacetylation is carried out by ammonolysis.

4. A process as defined in claim 1 wherein said deacetylation is carried out by fuming said trifluoroacetate derivative with gaseous ammonia.

5. The process of preparing a molecularly oriented film of cellulose comprising the steps of treating cellulose with a mixture of trifluoroacetic acid and trifluoroacetic anhydride to form thereby cellulose trifluoroacetate, casting a film of said cellulose trifluoroacetate, orienting said cast film by stretching and converting said oriented film to cellulose by exposing said film to gaseous ammonia.

6. The process of preparing a light polarizer comprising the steps of preparing the trifluoroacetate derivative of a polymer selected from the group consisting of cellulose and polyhydroxymethylene, casting a film of said trifluoroacetate derivative, molecularly orienting said film by extending linearly, deacetylating said oriented film under conditions which do not allow relaxation, and incorporating in said oriented film a material selected from the class consisting of dichroic dyes and stains.

7. A process as defined in claim 6 wherein said deacetylation is carried out by treating said oriented polymer with gaseous ammonia, and said dichroic dye is Congo Red C.I. 2212 (Direct Red 28).

References Cited in the file of this patent

UNITED STATES PATENTS

| 2,049,431 | Dreyfus | Aug. 4, 1936 |
| 2,121,040 | Moncrieff et al. | June 21, 1938 |

OTHER REFERENCES

Golding: "Polymers and Resins," D. Van Nostrand Co., Inc., Princeton, New Jersey, 1959, pp. 195–196 relied upon.